April 22, 1924.

R. A. OSBURN

SHOCK ABSORBER

Filed Sept. 25, 1922

1,491,207

Inventor
R. A. OSBURN.

By
Attorney

Patented Apr. 22, 1924.

1,491,207

UNITED STATES PATENT OFFICE.

ROBERT A. OSBURN, OF BIRMINGHAM, ALABAMA.

SHOCK ABSORBER.

Application filed September 25, 1922. Serial No. 590,247.

*To all whom it may concern:*

Be it known that I, ROBERT A. OSBURN, a citizen of the United States of America, residing at Birmingham, in the county of Jefferson and State of Alabama, have invented certain new and useful Improvements in Shock Absorbers, of which the following is a specification.

My invention relates to a shock absorber adapted for use on automobiles and other vehicles.

The object of my invention is to combine with the vehicle spring an auxiliary spring and dashpot so designed and disposed that they act together jointly not only to cushion the movements of the body and running gear responsive to jolts from road irregularities but also most effectively to absorb the rebound shock.

My invention contemplates the combination in a shock absorber of a spring to neutralize the jolts and pounding and a dashpot to cushion the rebound or recoil.

My invention further contemplates so co-relating the spring and dashpot that one modifies the action of the other.

More particularly my invention contemplates the combination of a coiled spring having its ends connected respectively to the body and running gear and adapted to move in a plane with the upright coil or coils so that the spring's resistance is substantially uniform and I connect to the spring coil the plunger of a dashpot also connected by toggle links to the body and running gear, the dashpot having means to cause it to restrain more especially the rebound or recoil motions of the body and running gear.

My invention also contemplates attaching the spring and toggle links to the same clips or brackets and applying these brackets either to the body and running gear or to the upper and lower members of the spring, or in lieu of the spring shackles.

My invention will be better understood by reference to the accompanying drawings which illustrate only the preferred embodiments thereof, and in which:—

Similar reference numerals refer to similar parts throughout the drawings.

Figure 1:
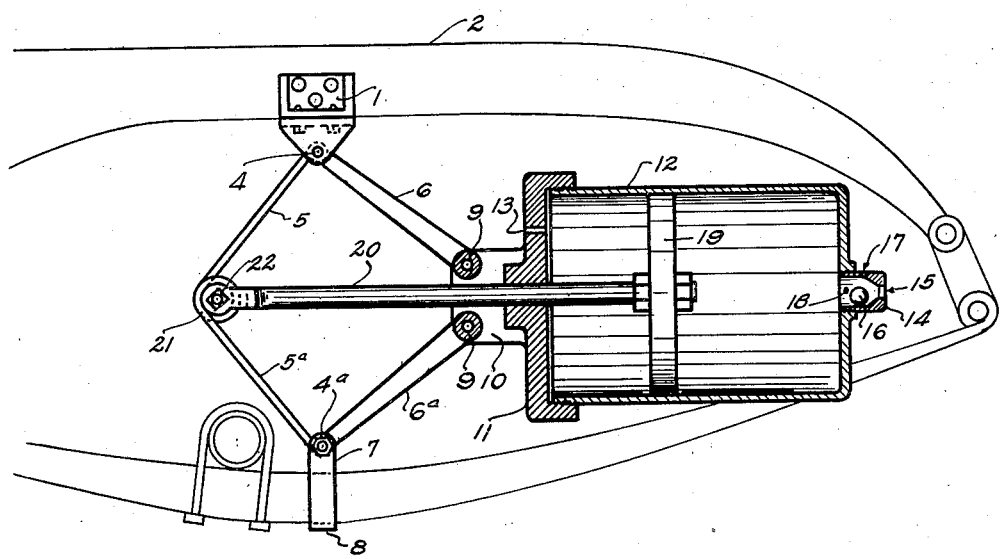
Fig. 1 is a side elevation of my improved combination spring and dashpot shock absorber with the dashpot cylinder shown in cross-section and parts of the body and running gear illustrated in dotted lines.
Figure 3:
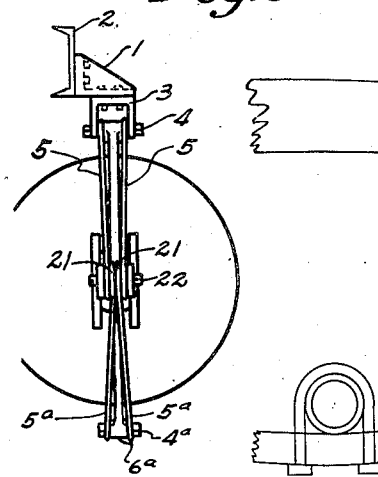
Fig. 3 is an end view of Fig. 1.

In the preferred embodiment illustrated, I show an upper yoke bracket 1 adapted for connection to the frame member 2 of an automobile chassis or vehicle body and having attached thereto, or formed integral therewith, a yoke casting 3 to which I pivot by means of a bolt 4 the upper ends of coil springs 5 and the upper toggle link 6, the latter being preferably interposed between the spring arms and all three being strung on the bolt 4 between the sides of the yoke bracket. In like manner the lower ends $5^a$ of the springs are pivotally connected on a bolt $4^a$ mounted in a bracket 7 on a clip 8 adapted to be attached to the leaf spring or any other desirable part of the running gear. The lower link $6^a$ is also pivotally mounted on the bolt $4^a$ between the spring ends $5^a$ and the links 6 and $6^a$ are pivotally connected by bolts or pins 9 to bearing lugs 10 cast or otherwise mounted on a cylinder head 11. This head is attached to a dashpot cylinder 12 and has a restricted air port 13. A valve body 14 is screwed into the end of the cylinder remote from the head and carries a valve port 15 having a ball valve 16 adapted to seat by movement outwardly from the cylinder. Air relief ports 17 are provided in the valve body and a stop pin 18 holds the valve loosely in the valve body. A piston 19 is movable substantially fluid tight in the cylinder by a piston rod 20 passing outwardly through the head 11 midway between the bolts 9 and bifurcated at its outer end. The coils 21 of the springs are interposed between the furcations on the rod 20 and are connected thereto by a bolt 22 passing through the coils and the furcations.

Figure 4:
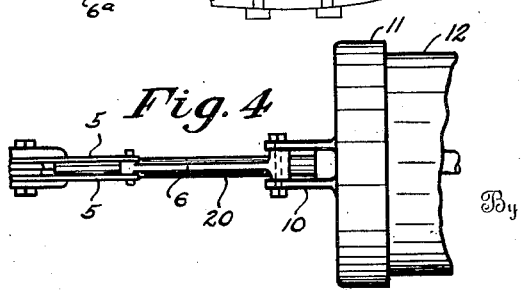
Fig. 4 is a plan view of Fig. 1 with the cylinder partly broken away.

It will be observed, by reference to Fig. 4, that the spring coils 21 are disposed upright or vertically and are reversely coiled so that the legs $5^a$ come to the center of the bolt 22 while the legs 5 come to the ends of the bolt. In this manner the thrust from the springs is balanced on the bolts 4, $4^a$ and 22, and as the body or running gear moves responsive to a primary jolt or displacement, the spring arms are drawn together and hence oppose with an almost uniform resistance the jolt and at the same time the coils are caused to move away from the dashpot. In like manner such movement draws the toggle links 6, 6ª together and thrusts the cylinder away from said spring coils with the result that the piston is drawn to the left and the cylinder is thrust to the right, as viewed in Fig. 1. The piston is supposed to move freely towards the left hand end of the cylinder, leaving the spring to absorb the jolts but it may act with a dashpot action to increase the easy riding effect. On the rebound or recoil the spring coils and dashpot cylinder are drawn together and the piston is thereby forced towards the right hand end of the dashpot cylinder, causing the check valve 16 to assume its closed position and hence allowing only a restricted outflow of air through the small ports 17. Under these conditions the cylinder acts as a dashpot to cushion the rebound. At all times it will be observed that the cylinder moves positively responsive to the toggle action of its arm 6, 6ª, while its piston moves oppositely responsive to the action of the spring which forms a more or less yielding toggle for moving the piston rod. I thus bring into a new and effective combination the type of spring shown and the dashpot, each modifying the action of the other, and I obtain an unusually effective shock absorber as a result.

While I have shown two springs 5, 5ª, it will be understood that more or less may be used according to the requirements for which each shock absorber is designed, and it is immaterial to what portions of the body, running gear or spring the brackets 3 and 7 are attached.

Figure 2:
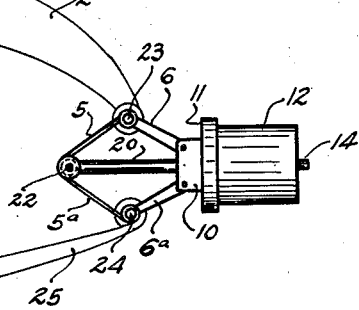
Fig. 2 is a similar view showing the cylinder in elevation and the device applied in the place of the spring shackles between the ends of the leaf spring and the spring hanger.

In Fig. 2 I show a modification of my invention wherein the upper arm 5 and link 6 are connected to the shackle bolt 23 on the spring hanger 26 on the body or chassis 2 and the lower arms 5ª and 6ª are connected to a shackle bolt 24 in the eye of the leaf spring 25. The action of the parts is the same as that already described, except the shock absorber here becomes effective between the body and free end of the leaf spring and takes the place of the shackles.

When I refer to the body I use such term broadly to refer to any part of the chassis or body supported by the springs, and when I refer to the running gear I use such term broadly to include the running gear or any part directly connected thereto, such as the usual springs.

Though I have described with great particularity the details of the embodiment of the invention herein shown, it is not to be construed that I am limited thereto as changes in arrangement and substitution of equivalents may be made by those skilled in the art without departing from the invention as defined in the appended claims.

Having thus described my invention, what I claim as new and desire to secure by Letters Patent, is:—

1. In a shock absorber, a coil spring having its coils disposed upright and its ends connected to the body and running gear of the vehicle, a dashpot comprising as coacting elements a piston and cylinder, means connecting one of said elements to the spring coils, toggle means connecting the other element to the body and running gear, and means to regulate the dash-potting action of said dashpot elements as they are moved relatively.

2. In a shock absorber, a coil spring having its coils disposed upright and its ends connected to the body and running gear of a vehicle, a dash-pot comprising as co-acting elements a piston and a cylinder having means to trap a body of fluid between the piston and cylinder to oppose a recoil movement between the body and running gear, means connecting one of the dash-pot elements to the spring coils, and toggle means connecting the other dash-pot element to the body and running gear.

3. In a shock absorber having coils disposed upright and its ends connected to the body and running gear of a vehicle, a dashpot comprising as co-acting elements a piston and cylinder, means connecting one of said dash-pot elements to the spring coil, and toggle means connecting the other dash-pot element to the body and running gear, said spring ends and toggle connections being inclined in opposite directions.

4. In a shock absorber, a coil spring having its ends connected respectively to the body and running gear of a vehicle, a dashpot comprising as co-acting elements a piston and cylinder, means connecting one of said dash-pot elements to the spring coils, toggle links connecting the other element to the body and running gear, and common bracket members to which adjacent spring ends and toggle links are connected and which are adapted to be attached to the body and running gear respectively.

5. A shock absorber in accordance with claim 1, in which the spring ends and toggle connections are inclined in opposite directions to a vertical plane between them.

In testimony whereof I affix my signature.

ROBERT A. OSBURN.

Witness:
NOMIE WELSH.